Sept. 6, 1932.   G. MAIURI ET AL   1,875,626
REFRIGERATION
Filed May 26, 1930

Inventors
Guido Maiuri
and Raoul F. Bossini
by Wilkinson & Mawhinney
Attorneys.

Patented Sept. 6, 1932

1,875,626

UNITED STATES PATENT OFFICE

GUIDO MAIURI AND RAOUL FELICE BOSSINI, OF LONDON, ENGLAND, ASSIGNORS, BY MESNE ASSIGNMENTS, TO ELECTROLUX SERVEL CORPORATION, A CORPORATION OF DELAWARE

REFRIGERATION

Application filed May 26, 1930, Serial No. 455,770, and in France May 31, 1929.

In absorption systems, as generally known, refrigerant vapor is introduced into the presence of a flowing stream of one or more bodies of absorption liquid. It is a principal object of our invention to provide a refrigerating system operating with a solution (or mixture) of refrigerant and what is generally termed absorption liquid, for example, a solution of ammonia in water, but which system differs radically from generally known systems in the manner of forming the solution after evaporation of the refrigerant. The invention is not limited to particular fluids, but may use a variety of groups of liquefiable gases, the fluids used together having substantially different critical temperatures with respect to change of state between liquid and gaseous form. Suitable substances are, for example, sulphur dioxide and carbon dioxide, or ethyl alcohol and methyl chloride.

Our improved process comprises introducing vaporous refrigerant into the presence of vaporous absorption medium and reducing the temperature of the resultant mixture sufficiently to cause the absorption medium to condense and form a cloud or mist. This cloud or mist is made up of innumerable minute particles of liquid distributed in a gaseous atmosphere and these particles present a very great surface. This great surface greatly increases the rate of absorption of the refrigerant vapor with respect to the quantity of absorption medium. The mist, consisting of absorption medium and refrigerant absorbed or mixed therewith, is then further cooled in order to precipitate the mist in the form of a homogeneous liquid.

We have determined that a refrigerating apparatus embodying this method has an increased efficiency and capacity over the previously known type of apparatus above referred to.

Figure 1:
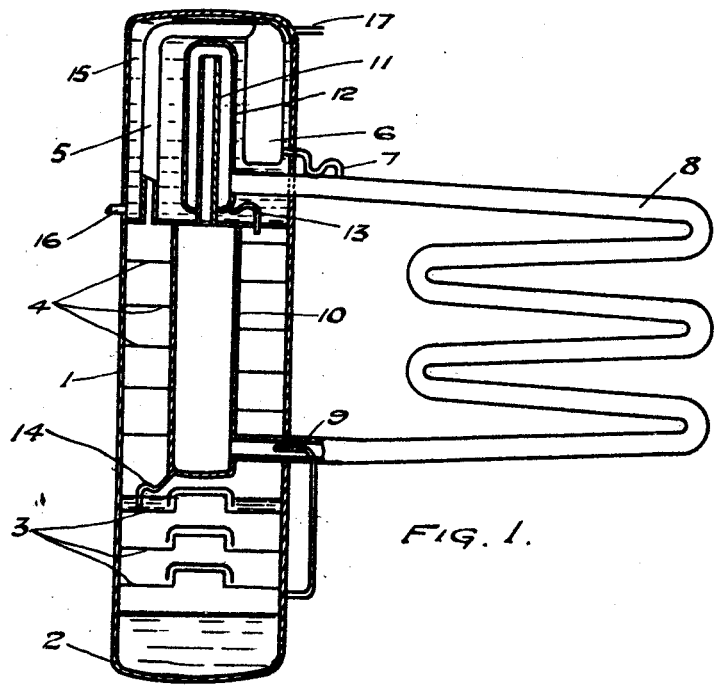
Figure 2:
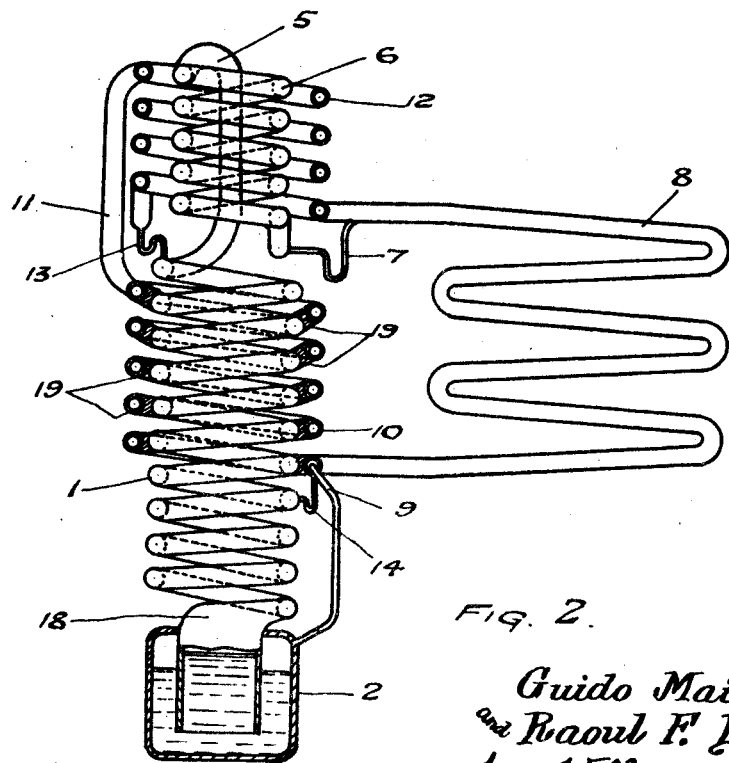

The nature of the invention and several modes of carrying the same into effect will be ascertained from the following description considered in conjunction with the accompanying drawing forming a part of this specification, of which:

Fig. 1 is a more or less diagrammatic view, partly in cross-section, of a refrigerating apparatus embodying our invention; and Fig. 2 is a view, partly in cross-section, of a somewhat modified apparatus.

Referring more particularly to Fig. 1, reference character 1 designates a container which is preferably cylindrical. The lower part of container 1 constitutes a generator portion 2, which is heated by any suitable means. Above generator portion 2 is a series of bubble trays 3 having apertures surrounded by raised rims and covered by caps as is well-known in distillation apparatus. The arrangement is such that vapor passing upwardly through the openings in the bubble trays must pass through liquid on the trays, and so the liquid offers a resistance to flow and serves to create a pressure differential.

In the more central part of the container 1 there is a cooling chamber 10. Around chamber 10 is a series of plates 4. Plates may also be provided within chamber 10 for retaining condensate, with the object of insuring as good a transmission of heat as possible.

The upper part of container 1 comprises a water jacket which is supplied with cooling water through a conduit 16. Water is discharged therefrom through conduit 17. A conduit 5 communicates with the space around cooling chamber 10 and extends through the water jacket and communicates with a condenser member 6.

Located within the water jacket there is a precipitation chamber 12 which is connected to cooling chamber 10 by means of a conduit 11 which extends from the upper part of chamber 10 to the upper part of precipitation chamber 12. A conduit 13 adapted to provide a liquid seal therein connects the bottom of precipitation chamber 12 with the upper part of the space outside the cooling chamber 10 and is arranged to discharge liquid onto the uppermost plate 4.

An evaporator 8 is connected to the lower part of precipitation chamber 12. A conduit 7 adapted to provide a liquid seal therein, connects the lower part of condenser 6 with the upper part of evaporator 8. The lower end of the evaporator communicates with the lower part of cooling chamber 10. A conduit 9 communicates with the generator portion 2 of the container 1 and extends within the conduit connecting evaporator 8 with the lower part of cooling chamber 10. Conduit 9 as shown is formed to project a jet of fluid toward the cooling chamber 10.

The operation of the above described apparatus is essentially as follows:

A liquid comprising substantially pure absorption fluid, for instance, water, is contained in the generator portion 2 of container 1. The application of heat to generator portion 2 causes vaporization of this liquid, thus producing steam in the case of water. The steam passes partly through conduit 9 and issues as a gas from the upper end of conduit 9. The generator portion 2 is thus an absorption fluid vaporizer.

The liquid contained on the bubble trays above generator portion 2 consists of a solution of absorption liquid and refrigerant, such as ammonia, which solution has been discharged through conduits 13 and 14. The passage of vaporous absorption fluid, in this case steam, through the liquid on the bubble trays, heats the liquid and causes the refrigerant to be driven from solution therein, and this refrigerant passes upwardly through container 1. It will be seen that the device has the characteristics of a fractionating tower or rectifier, the refrigerant constituting the head fluid and the absorption medium the tail fluid which flows downwardly in the nature of reflux liquid to the bottom and is caused to pass in relatively pure state through conduit 9.

As the refrigerant is driven out of solution and passes upwardly, steam is condensed and the condensate passes downwardly toward the generator portion 2. Due to the fact that the steam passing upwardly through the bubble trays must bubble through the liquid thereon, there exists a somewhat higher pressure in the generator chamber 2 below the bubble trays than above the bubble trays.

A strong solution of absorption liquid and refrigerant passes through conduit 13 onto the plates 4. Refrigerant vapor is driven from this solution due to heat, of which a large portion is transmitted from chamber 10. Thus the chamber or space surrounding chamber 10 constitutes a refrigerant vaporizer. The refrigerant vapor formed on plates 4 passes upwardly along with the refrigerant vapor formed on the bubble trays 3 and all the expelled refrigerant vapor passes through conduit 5 where it is cooled somewhat and vapor of absorption liquid is condensed and flows back onto plates 4 toward the bottom of the container. Thus conduit 5 has the function of the generally known rectifier of an absorption refrigerating system. The substantially pure refrigerant vapor passes to the condenser member 6 where it is further cooled and liquefied. The liquid refrigerant passes through conduit 7 into the upper part of evaporator 8.

A gas, inert with respect to the refrigerant and the absorption liquid, which may be of various known kinds, is introduced into evaporator 8 from precipitation chamber 12. In the evaporator the liquid refrigerant evaporates in the presence of the inert gas, diffusing thereinto in well-known manner, and refrigeration is produced. The vaporized mixture of refrigerant and inert gas passes from the evaporator to the cooling chamber 10. The gas circulation may be produced entirely by the jet issuing from the conduit 9 or, if the inert gas is lighter than the refrigerant, the circulation may be in part produced by differences of specific gravity of the gaseous fluid and in part by the jet issuing from the conduit 9.

There is thus introduced into cooling chamber 10 a ternary mixture of inert gas, refrigerant vapor, and vapor of absorption medium. This ternary mixture is cooled somewhat by the liquid in heat exchange relation with the chamber 10 on the plates 4, and this cooling causes the formation in chamber 10 of a mist or cloud of absorption medium. This mist consists of a great number of very small particles of absorption liquid held in suspension in the other gases, and these particles present a very great surface for the absorption of gaseous refrigerant. Hence, the refrigerant, or most of it, is absorbed by the mist, and the mist and inert gas and any unabsorbed refrigerant pass through conduit 11, still essentially as a gas, to the upper part of precipitation chamber 12. In the precipitation chamber 12 the temperature of the mixture is further reduced due to the cooling water, and the mist is caused to precipitate to form a homogeneous liquid consisting of refrigerant absorbed in absorption medium. This liquid passes out of chamber 12 through conduit 13 and is distributed over plates 4 around chamber 10. In passing downwardly over plates 4, the refrigerant is driven from solution, as previously described, due to the fact that the solution is heated by the heat of condensation and absorption of the fluid in cooling chamber 10. The inert gas, deprived essentially of refrigerant and vapor of absorption medium, passes from the lower part of precipitation chamber 12 to the upper part of evaporator 8.

It will be seen that the inert gas circuit includes a first cooling chamber 12, the evaporator 8, and a second cooling chamber 10, which parts are interconnected, and that the first cooling chamber, that is, precipitation chamber 12, is maintained at a lower temperature than the second cooling chamber 10.

In Fig. 2, there is shown a somewhat modified embodiment of my invention. In place of the cylindrical container, there is provided a helical coil 1. The lower end of coil 1 is provided with an enlarged end 18 which extends to near the bottom of a generator chamber 2. The upper end of coil 1 is connected by means of a conduit 5 with the upper end of a condenser 6, which is likewise in the form of a helical coil. The lower end of condenser 6 is connected by means of a conduit 7 with the upper end of evaporator 8. The lower end of evaporator 8 is connected to cooling chamber 10 which is also in the form of a coil. Chamber 10 and coil 1 are placed in heat exchange relationship with each other, as shown at 19. The upper end of coil 10 is connected by means of conduit 11 with the upper end of a precipitation member or coil 12. Conduits 13 and 14, each adapted for the formation therein of a liquid seal, connect the lower ends of coils 12 and 10, respectively, with coil 1. The lower end of coil 12 is connected to the upper end of evaporator 8. A conduit 9 connects the upper part of generator chamber 2 with the lower part of cooling coil 10. The same reference characters have been used in describing Fig. 2 as were used in connection with Fig. 1, as the parts bearing like reference characters, while having different form, perform the same functions in both embodiments.

The apparatus shown in Fig. 2 operates in the same manner as that of Fig. 1. Vapor of absorption medium is generated in generator chamber 2 by the application of heat thereto and passes through conduit 9 to the lower part of coil 10. Some vapor passes into the lower end of coil 1 and serves to drive refrigerant from solution in absorption fluid therein. The refrigerant vapor thus formed passes from the upper end of coil 1 through conduit 5 to condenser member 6, where it is cooled and liquefied. The liquefied refrigerant passes through conduit 7 into evaporator 8, where it evaporates in the presence of an inert gas supplied to the evaporator from the lower end of precipitation coil 12. The vaporous mixture of inert gas and refrigerant formed in evaporator 8 is introduced into the lower end of coil 10 where it is mixed with vaporous absorption medium introduced through conduit 9. In coil 10 the mixture is cooled sufficiently to form a mist of absorption fluid, which mist absorbs a large portion of the refrigerant. This mist and the inert gas pass through conduit 11 to precipitation coil 12, where further cooling takes place and the mist is precipitated to form a homogeneous liquid. In coil 12, any refrigerant which was not absorbed in coil 10, is absorbed. The liquid thus formed in coil 12 passes therefrom through conduit 13 to the upper end of coil 1 wherein the refrigerant is driven from solution due to the heating by the hot vapors of absorption fluid introduced into coil 1 from the generator chamber 2 and due to the heat transferred thereto from member 10. The inert gas, deprived of refrigerant, passes from the lower end of precipitation coil 12 to evaporator 8.

The members 5, 6 and 12 are directly cooled by air. Fins may be spaced on the pipes to increase the cooling effect of the air. The transmission of heat between the coil 1 and the coil 10 may be obtained by solder connections at 19.

It will, of course, be understood that the above apparatuses have only been described by way of non-limitative examples, as a large number of devices known in systems of distilling and rectifying and refrigeration in general may be adapted to carry out the invention.

Instead of using an inert gas to counterbalance the difference in pressure between the condenser 6 and the evaporator coil 8, any suitable pressure-reducing member may be provided in the conduit 7, and a pump or other appropriate pressure differential means may be employed for forcing the condensed liquid back to the rectifying apparatus.

In order to facilitate the absorption of the ammonia, water vapor may be injected at several points in the chamber 10 instead of at only one point. An inlet for water vapor may, for example, be provided in the pipe 11 in addition to the inlet 9.

Having now particularly described and ascertained the nature of our said invention and in what manner the same is to be performed, we declare that what we claim is:—

1. That improvement in the art of refrigeration which consists in forming a ternary mixture of refrigerant vapor, inert gas and vapor of absorption liquid and lowering the temperature of the ternary mixture in stages.

2. That improvement in the art of refrigeration which consists in forming a ternary mixture of refrigerant vapor, inert gas and vapor of absorption liquid, lowering the temperature of the ternary mixture in stages to form a liquid solution of absorption liquid and refrigerant and bringing said solution in heat exchange relationship with said mixture.

3. That improvement in the art of refrigeration which consists in forming a ternary mixture of refrigerant vapor, inert gas and vapor of absorption liquid, lowering the temperature of the ternary mixture in stages to form a liquid solution of absorption liquid and refrigerant, bringing said solution in heat exchange relationship with said mixture to produce refrigerant vapor from said solution, and separately vaporizing the remaining absorption liquid.

4. That improvement in the art of refrigeration which consists in separately producing vapor of absorption liquid and vapor of refrigerant, condensing the refrigerant vapor, introducing the condensed refrigerant into the presence of an inert gas to evaporate the refrigerant and form a mixture of refrigerant vapor and inert gas, introducing the vapor of absorption liquid into said mixture to form a ternary mixture, conducting the ternary mixture into heat exchange relation with the refrigerant being vaporized and separating the constituents of the ternary mixture by cooling and reflux action.

5. That improvement in the art of refrigeration which consists in separately producing vapor of absorption liquid and vapor of refrigerant, condensing the refrigerant vapor, introducing the condensed refrigerant into the presence of an inert gas to evaporate the refrigerant and form a mixture of refrigerant vapor and inert gas, introducing the vapor of absorption liquid into said mixture to form a ternary mixture, conducting the ternary mixture into heat exchange relation with the refrigerant being vaporized and separating the constituents of the ternary mixture by lowering the temperature of the ternary mixture in stages.

6. That improvement in the art of refrigeration which consists in heating a solution of refrigerant in absorption liquid to produce vapor of refrigerant, condensing the refrigerant vapor, introducing the condensed refrigerant into the presence of an inert gas to evaporate the refrigerant and form a mixture of refrigerant vapor and inert gas, further heating the absorption liquid to produce vapor thereof, introducing the vapor of absorption liquid into said mixture to form a ternary mixture, conducting the ternary mixture into heat exchange relation with the refrigerant being vaporized and separating the constituents of the ternary mixture by cooling and reflux action.

7. That improvement in the art of refrigeration which consists in heating a solution of refrigerant in absorption liquid to produce vapor of refrigerant, condensing the refrigerant vapor, introducing the condensed refrigerant into the presence of an inert gas to evaporate the refrigerant and form a mixture of refrigerant vapor and inert gas, further heating the absorption liquid to produce vapor thereof, introducing the vapor of absorption liquid into said mixture to form a ternary mixture, conducting the ternary mixture into heat exchange relation with the refrigerant being vaporized and separating the constituents of the ternary mixture by lowering the temperature of the ternary mixture in stages.

8. That improvement in the art of refrigeration which consists in separately producing vapor of absorption liquid and vapor of refrigerant, condensing the refrigerant vapor, introducing the condensed refrigerant into the presence of an inert gas to evaporate the refrigerant and form a mixture of refrigerant vapor and inert gas, introducing the vapor of absorption liquid into said mixture to form a ternary mixture, conducting the ternary mixture into heat exchange relation with the refrigerant being vaporized and forming a liquid solution of absorption liquid and refrigerant by cooling and reflux action.

9. That improvement in the art of refrigeration which consists in separately producing vapor of absorption liquid and vapor of refrigerant, condensing the refrigerant vapor, introducing the condensed refrigerant into the presence of an inert gas to evaporate the refrigerant and form a mixture of refrigerant vapor and inert gas, introducing the vapor of absorption liquid into said mixture to form a ternary mixture, conducting the ternary mixture into heat exchange relation with the refrigerant being vaporized and forming a liquid solution of absorption liquid and refrigerant by lowering the temperature of the ternary mixture in stages.

10. In refrigerating apparatus, the combination of a refrigerant vaporizer, an absorption fluid vaporizer, and means providing restricted communication therebetween.

11. In refrigerating apparatus, the combination of a refrigerant vaporizer, an absorption fluid vaporizer, and bubble trays providing restricted communication therebetween.

12. In refrigerating apparatus, the combination of a reflex refrigerant vaporizer, an absorption fluid vaporizer, and bubble trays providing restricted communication therebetween.

13. In refrigerating apparatus, the combination of a reflux refrigerant vaporizer, an absorption fluid vaporizer, and means providing restricted communication therebetween.

14. In refrigerating apparatus, the combination of a reflux refrigerant vaporizer, an absorption fluid vaporizer, and liquid sealing means for maintaining a higher pressure in said absorption fluid vaporizer than in said refrigerant vaporizer while permitting passage of liquid therebetween.

15. In refrigerating apparatus, the combination of a reflux refrigerant vaporizer, an absorption fluid vaporizer, and bubble trays for maintaining a higher pressure in said absorption fluid vaporizer than in said refrigerant vaporizer and permitting passage of liquid therethrough.

16. In a refrigerating apparatus, the combination of a refrigerant vaporizer, an absorption fluid vaporizer, and liquid sealing means for maintaining a higher pressure in said absorption fluid vaporizer than in said refrigerant vaporizer while permitting passage of liquid therebetween.

17. Refrigerating apparatus comprising a refrigerant vaporizer, an absorption fluid vaporizer, means providing restricted communication therebetween, a condenser connected to receive vapor from said refrigerant vaporizer, members forming a circuit for an inert gas including an evaporator, means to conduct liquefied refrigerant from said condenser to said evaporator, means to conduct vapor of absorption fluid from said absorption fluid vaporizer into said inert gas circuit, and means to conduct liquid from said inert gas circuit to said refrigerant vaporizer.

18. Refrigerating apparatus comprising a refrigerant vaporizer, an absorption fluid vaporizer, means providing restricted communication therebetween, a condenser connected to receive vapor from said refrigerant vaporizer, members forming a circuit for an inert gas including an evaporator, means to conduct liquefied refrigerant from said condenser to said evaporator, means to conduct vapor of absorption fluid from said absorption fluid vaporizer into said inert gas circuit, and means to conduct liquid from said inert gas circuit to said refrigerant vaporizer, a part of said inert gas circuit being in heat exchange relation with said refrigerant vaporizer.

19. Refrigerating apparatus comprising a refrigerant vaporizer, an absorption fluid vaporizer, means providing restricted communication therebetween, a condenser connected to receive vapor from said refrigerant vaporizer, members forming a circuit for an inert gas including an evaporator, a cooled chamber, and a chamber in heat exchange relation with said refrigerant vaporizer, means to conduct liquefied refrigerant from said condenser to said evaporator, means to conduct vapor of absorption fluid from said absorption fluid vaporizer into said inert gas circuit, and means to conduct liquid from said inert gas circuit to said refrigerant vaporizer.

20. Refrigerating apparatus comprising a refrigerant vaporizer, an absorption fluid vaporizer, bubble trays providing restricted communication therebetween, a condenser connected to receive vapor from said refrigerant vaporizer, members forming a circuit for an inert gas including an evaporator, means to conduct liquefied refrigerant from said condenser to said evaporator, means to conduct vapor of absorption fluid from said absorption fluid vaporizer into said inert gas circuit, and means to conduct liquid from said inert gas circuit to said refrigerant vaporizer.

21. Refrigerating apparatus comprising a refrigerant vaporizer having extended surface members therein, an absorption fluid vaporizer, means providing restricted communication therebetween, a condenser connected to receive vapor from said refrigerant vaporizer, members forming a circuit for an inert gas including an evaporator, means to conduct liquefied refrigerant from said condenser to said evaporator, means to conduct vapor of absorption fluid from said absorption fluid vaporizer into said inert gas circuit, and means to conduct liquid from said inert gas circuit to said refrigerant vaporizer.

22. Refrigerating apparatus comprising a refrigerant vaporizer having extended surface members therein, an absorption fluid vaporizer, bubble trays providing restricted communication therebetween, a condenser connected to receive vapor from said refrigerant vaporizer, members forming a circuit for an inert gas including an evaporator, means to conduct liquefied refrigerant from said condenser to said evaporator, means to conduct vapor of absorption fluid from said absorption fluid vaporizer into said inert gas circuit, and means to conduct liquid from said inert gas circuit to said refrigerant vaporizer.

23. Refrigerating apparatus comprising a refrigerant vaporizer having extended surface members therein, an absorption fluid vaporizer, bubble trays providing restricted communication therebetween, a condenser connected to receive vapor from said refrigerant vaporizer, members forming a circuit for an inert gas including an evaporator, and first and second cooling chambers, said second cooling chamber being in heat exchange with said refrigerant vaporizer, means to conduct liquefied refrigerant from said condenser to said evaporator, means to conduct vapor of absorption fluid from said absorption fluid vaporizer into said second cooling chamber, and means to conduct liquid from said first cooling chamber to said refrigerant vaporizer.

24. Refrigerating apparatus comprising a refrigerant vaporizer having extended surface members therein, an absorption fluid vaporizer, bubble trays providing restricted communication therebetween, a condenser connected to receive vapor from said refrigerant vaporizer, members forming a circuit for an inert gas including an evaporator, and first and second cooling chambers, said second cooling chamber being in heat exchange with said refrigerant vaporizer, means to conduct liquefied refrigerant from said condenser to said evaporator, means to conduct vapor of absorption fluid from said absorption fluid vaporizer into said second cooling chamber, means to conduct liquid from said first cooling chamber to said refrigerant vaporizer, and means to conduct liquid from said second cooling chamber to said absorption fluid vaporizer.

25. Refrigerating apparatus comprising a refrigerant vaporizer having extended surface members therein, an absorption fluid vaporizer, bubble trays providing restricted communication therebetween, a condenser connected to receive vapor from said refrigerant vaporizer, members forming a circuit for an inert gas including an evaporator, and first and second cooling chambers, said second cooling chamber being in heat exchange with said refrigerant vaporizer, means to conduct liquefied refrigerant from said condenser to said evaporator, means to conduct vapor of absorption fluid from said absorption fluid vaporizer into said second cooling chamber, and means comprising a liquid seal to conduct fluid from said first cooling chamber to said refrigerant vaporizer.

26. Refrigerating apparatus comprising a refrigerant vaporizer having extended surface members therein, an absorption fluid vaporizer, bubble trays providing restricted communication therebetween, a condenser connected to receive vapor from said refrigerant vaporizer, members forming a circuit for an inert gas including an evaporator, and first and second cooling chambers, said second cooling chamber being in heat exchange with said refrigerant vaporizer, means to conduct liquefied refrigerant from said condenser to said evaporator, means to conduct vapor of absorption fluid from said absorption fluid vaporizer into said second cooling chamber, means comprising a liquid seal to conduct fluid from said first cooling chamber to said refrigerant vaporizer, and means comprising a liquid seal to conduct liquid from said cooling chamber to said absorption fluid vaporizer.

27. In a refrigerating apparatus, a vaporizer, means for heating said vaporizer, a condenser, means for conducting vaporous refrigerant from said vaporizer to said condenser, means for cooling said condenser to liquefy the vaporous refrigerant therein, an evaporator, means for conducting liquid refrigerant from said condenser to said evaporator, a first chamber, means for conducting an inert gas from said chamber to said evaporator, a second chamber, means for conducting refrigerant and inert gas from said evaporator to said second chamber, means for conducting vaporous absorption liquid from said vaporizer to said second chamber, means establishing communication between said chambers, means for cooling said second chamber, and means for cooling said first chamber to a lower temperature than said second chamber.

28. In a refrigerating apparatus, an evaporator, means for supplying refrigerant and an inert gas to said evaporator, a first chamber, a second chamber connected to said first chamber, means for conveying refrigerant and inert gas from said evaporator to said second chamber, means for supplying vaporous absorption liquid to said second chamber, means for cooling said second chamber, and means for cooling said first chamber to a lower temperature than said second chamber.

29. In a refrigerating apparatus, an evaporator, means for supplying refrigerant and an inert gas to said evaporator, a first chamber, a second chamber connected to said first chamber, means for conveying refrigerant and inert gas from said evaporator to said second chamber, means for supplying vaporous absorption liquid to said second chamber, means for cooling said first chamber, and means for conveying liquid from said first chamber into heat exchange relationship with said second chamber to cool the latter.

30. A process of refrigeration which comprises introducing vaporous absorption fluid into the presence of vaporous refrigerant and inert gas, reducing the temperature of the resulting mixture sufficiently to change said vaporous absorption fluid to a mist, absorbing the vaporous refrigerant by said mist and further cooling the mixture to precipitate the mist.

31. A process of refrigeration which comprises vaporizing refrigerant from solution in an absorption liquid, liquefying the refrigerant, vaporizing the refrigerant in the presence of an inert gas to produce refrigeration, vaporizing absorption liquid, introducing vaporous absorption liquid into the presence of vaporous refrigerant and inert gas, cooling the resulting mixture to change said vaporous absorption liquid to a mist, absorbing the vaporous refrigerant by said mist, and further cooling the mixture to precipitate the mist.

32. In a refrigerating apparatus, a container, bubble trays in the lower part of said container, a first chamber in the upper part of said container, a condenser in the upper part of said container, means for cooling said first chamber and said condenser, a second chamber in the central part of said container, evaporation plates within said container adjacent to said second chamber, an evaporator connected to said first chamber and to said second chamber, a conduit between the portion of said container below said bubble trays and said second chamber, means for conveying liquid from said first chamber to said evaporation plates, means for conveying liquid from said second chamber to said bubble trays, and means for heating the lower part of said container.

GUIDO MAIURI.
RAOUL FELICE BOSSINI.